United States Patent [19]

Petrinec

[11] 3,873,921

[45] Mar. 25, 1975

[54] TWO LEVEL VOLUME CONTROL FOR CLOCK RADIO AND THE LIKE

[76] Inventor: Robert G. Petrinec, 617 S. East Ave., Oak Park, Ill. 60304

[22] Filed: Aug. 2, 1973

[21] Appl. No.: 385,034

[52] U.S. Cl. .................. 325/396, 58/24 R, 325/310, 325/319, 325/395, 325/401, 340/328

[51] Int. Cl. ............................................ H04b 1/06

[58] Field of Search ........... 325/310, 318, 319, 364, 325/395, 396, 397, 400, 401; 340/164 R, 164 B, 328, 384 E; 179/2 TC; 58/23 A, 24 R

[56] References Cited

UNITED STATES PATENTS 3,356,949 12/1967 Jones, Jr. ............................ 325/396

*Primary Examiner*—Robert L. Griffin
*Assistant Examiner*—Marc E. Bookbinder

[57] ABSTRACT

A circuit arrangement is provided for obtaining two volume levels for clock radios. One volume level is for providing a soft volume during an initial slumber period of the clock radio when it is intended that persons go to sleep, and the other volume level is a loud volume during a wake-up period when it is intended that persons are to be awakened from their sleep. The two level volume control includes a latching circuit which has one of the components thereof arranged to be a switching element which is activated for changing the volume control of the clock radio to a lower volume during a slumber period. When the clock radio is deenergized by turning off the automatic timer switch the latching is also deenergized. When the clock radio is again energized by means of the conventional clock operated on-off switch the latching circuit remains deenergized thus causing automatic deenergization of the switching element automatically to increase the volume produced by the radio during a radio alarm period.

10 Claims, 3 Drawing Figures

TWO LEVEL VOLUME CONTROL FOR CLOCK RADIO AND THE LIKE

BACKGROUND OF THE INVENTION

This invention relates generally to a volume control circuit for a radio, and more particularly to a volume control circuit for a clock radio.

Clock radios are well known in the art and often in the past attempts have been made to provide two volume levels for such radios, one volume level for a slumber period during which the radio plays at a reduced volume and shuts off automatically, and a second volume level during a wake-up period, during which the radio plays at an increased volume for awakening the user.

However, prior art type radios having the slumber and wake-up dual volume control features have been relatively complicated and expensive to manufacture. This is true because they all require the use of a cam operated switching circuit associated with the electric clock motor, and which switching circuit is actuated by the cam, or other gear driven mechanism, as a result of the clock motor reaching a present time. The case of this cam operated arrangement is such that it is an undesirable add-on to present radios because the general public is not willing to pay to the additional cost of manufacure. Furthermore, it is relatively complicated and requires substantial change in present clock radios and also thereby provides maintenance problems after the clock radios are in use.

SUMMARY OF THE INVENTION

Accordingly, it is among the primary features of this invention to provide a clock radio volume control circuit which completely eliminates the necessity of interconnection of separate cam operated switches with separate shafts or gears driven by the timing motor of the clock radio.

It is another feature of this invention to provide a new and novel clock radio volume control which functions in the intended manner, i.e. low volume when set for sleeping and high volume when set for waking, regardless of the mode, the clock radio is again energized, i.e. either by the clock operated turn-on switch or by the manually operated turn-on switch. The increase in volume is an automatic function of the circuit and therefore will not malfunction as a result of bad switch contacts or misaligned cam actuators associated with the clock mechanism.

Briefly, the automatic two level volume control circuit arrangement of this invention incorporates a latching circuit which may take the form of a direct current coupled bistable multivibrator which has one of the transistor switching elements thereof function as a switching device connected in circuit with the volume control. The bistable multivibrator is arranged to be energized to a specific conductive state each and every time power is applied thereto, i.e. one transistor always being nonconductive and the other transistor always to be conductive during an initial condition after power has been applied. A momentary contact switch is connected in the circuit to provide a set signal for the bistable multivibrator. When a low volume condition is desired, the momentary contact switch is closed and the multivibrator will change in state, whereby the state of conduction of the transistors changes. The switching element transistor is connected in circuit with the volume control thereby reducing the volume as a result of a shunt current path for the volume control circuit. When the slumber period is over, power is removed from the radio circuit by the normal operation of the on-off clock operated timer off switch. However, when the radio is again energized by the normal on-off clock operated power switch the bistable multivibrator will be again set to its normal condition and the volume control will be at a substantially increased level.

Many other objects features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
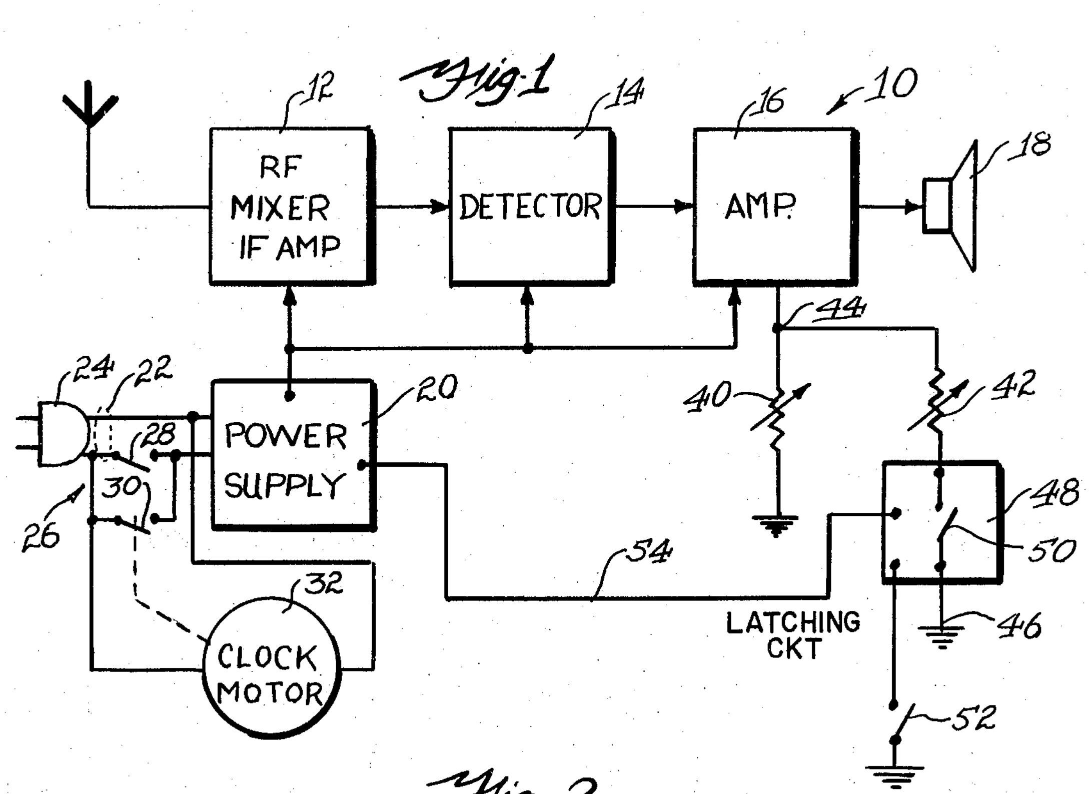
FIG. 1 is a simplified block diagram illustrating the basic components of a clock radio incorporating the novel two-level volume control of this invention.

Referring now to FIG. 1 there is seen a clock radio circuit designated generally by reference numeral 10 and which includes a standard RF mixer and IF-amplifier stage 12. The output signal from the stage 12 is delivered to a detection circuit stage 14 which, in turn, has the audiosignal information therefrom delivered to an audio amplifier stage 16 to be reproduced by a speaker 18. A power supply 20 has power lines extending therefrom and connected to each of the stages 12, 14, and 16 in a conventional manner as is well known in the art. The power supply 20 may be of the type adapted to be connected to a source of alternating current voltage by means of a line 22 having a plug 24 secured to the end thereof. The line 22 has one side thereof provided with switch means 26. The switch means 26, particularly in the case of clock radios, includes a first switch 28 which is manually opened and closed to deenergize and energize the power supply 20. Connected in parallel with the manual switch 28 is a clock operated switch 30 which is actuated open and closed by means of a clock motor 32 by means of a cam or the like, in a well known and conventional manner. Suitable selecting switches may be positioned on the clock radio to function in the automatic mode so that the clock motor 32 will open and close the switch 30.

Heretofore, clock radios with two level volume controls also incorporated a second switching and cam mechanism associated with the clock motor to function in a manner to actuate or place in circuit a second volume control resistance. As mentioned previously, this is an expensive and impractical approach to the problem.

A volume control 40, of the standard type, is connected to the amplifier stages 16 to vary the output level of the signal delivered to the speaker 18. It will be understood that the volume control 40 may be also connected to the detector circuit 14, if desired. In accordance with this invention a second resistance element 42 is connected in circuit with the volume control 40 by having one end thereof connected to a circuit point 44, and the other end thereof adapted to be connected to a reference potential, here being illustrated as ground potential as indicated by reference numeral 46. The other end of the resistor 42 is connected to a latching circuit 48 which includes a switching element 50 associated therewith. The latching circuit 48 is activated by means of a selector switch 52 which, in turn, causes the switching element 50 to close thereby connecting the other end of the resistor 42 to the reference potential 46. When this happens two resistance elements are placed in parallel and the effective volume delivered to the speaker 18 is reduced. Therefore, when the clock radio is energized in a mode to play for a predetermined period of time before shutting-off automatically by means of a timer switch, the effective volume of the radio can be reduced. When the clock operated switch 30 opens at the end of the automatic cycle, the entire power supply 20 is deactivated and this also deactivates the latching circuit 48 which is connected to the power supply by means of a line 54. When the clock motor 32 again closes switch 30, as for example, during an alarm cycle to wake up the user, the power supply will apply power to the stages 12, 14, and 16, and to the latching circuit 48, but the latching circuit 48 will not be activated to close the switching element 50. Therefore, resistor 42 is maintained out of the circuit and the high level of volume selected by volume control 40 is maintained. Therefore, the clock radio structure of this invention can have two volume levels, one volume level being relatively low during a slumber period when the user is going to sleep, and the other volume level being relatively loud, during an alarm period when the user is to wake up.

Figure 2:
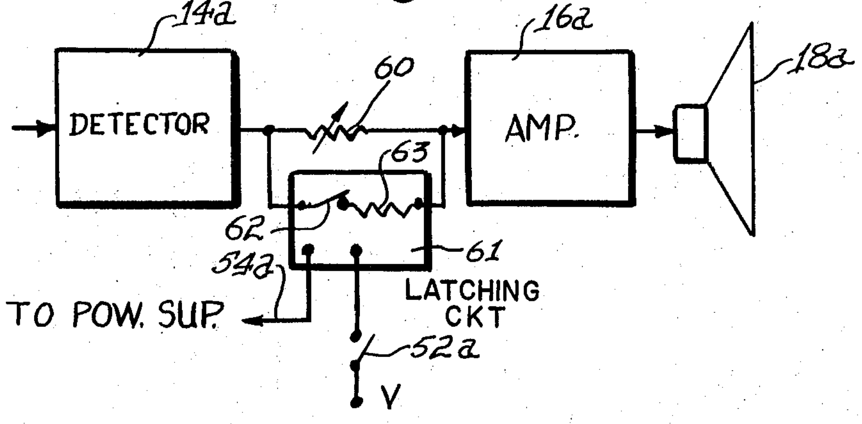
FIG. 2 is an alternate embodiment of a volume control circuit arrangement also contemplated by this invention.

While the embodiment of FIG. 1 illustrates the resistance element 42 as being connected in circuit in a parallel fashion to decrease volume, it can be understood that it can be connected in a fashion to increase volume when connected in circuit and to decrease volume when disconnected from the circuit. To best understand this modification an alternate embodiment of the present invention is illustrated in FIG. 2, and only the pertinent details are illustrated for a complete understanding thereof. Here the components similar to those of FIG. 1 are designated with a suffix a, as for example the detector 14a delivers a signal to the amplifier 16a which, in turn, drives the speaker 18a. However, in this embodiment the volume control is obtained by a series connected variable resistance element 60 which has connected in parallel therewith a latching circuit 61 which, in turn, is equipped with a switching element 62. In this instance the switching element 62 is initially operated in a normally closed condition so that a second resistor 63 is connected in parallel with the variable resistor 60 to provide a reduced resistance current path between the detector 14a and the amplifier 16a. Therefore, during normal operation the volume of the radio circuit is of relatively high value because of the low resistance of the volume control circuit. Closure of the selector switch 52a causes the latching circuit 61 to open the switching element 62 and disconnect the resistor 63 from the circuit. This will substantially instantaneously increase the resistance between the detector circuit 14a and the amplifier 16a to reduce the volume output of the speaker 18a. When power is removed from the latching circuit, by deenergization of line 54a when the clock operated switch 30, FIG. 1, opens the latching circuit will automatically cause closure of the switching element 62. Therefore, the next time the clock switch 30 closes, as for example, in the morning during an alarm operation, the volume of the loudspeaker 18a is automatically increased.

Figure 3:
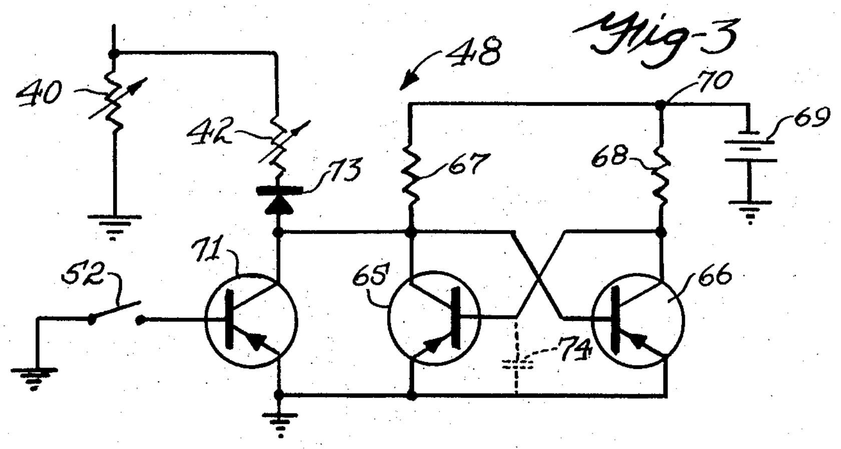
FIG. 3 is a detailed schematic showing of one specific form of latching and switching circuit which can be utilized in accordance with the principles of this invenion.

Referring now to FIG. 3 the details of construction of one type of latching circuit that can be used in accordance with this invention is illustrated in detail. The latching circuit 48 includes a plurality of transistors which are connected to form a direct-coupled bistable multivibrator having a pair of transistors 65 and 66 crosscoupled between the collector and base electrodes thereof in the usual manner of bistable multivibrators. Transistor load resistors 67 and 68 are connected in series with transistors 65 and 66, respectively, and deliver thereto operating current from a battery source 69. The battery source is here illustrated for purposes of clarity but it will be understood that the D.C. power obtained at terminal 70 can be DC power delivered across the line 54, FIG. 1, or 54a, FIG. 2, from the power supply 20. The value of the resistors 67 and 68 are selected so that each time power is applied to the direct-coupled bistable multivibrator the transistor 65 will always be rendered non-conductive while the transistor 66 will always be rendered conductive. A capacitor 74 may be used to insure that the desired transistors are conductive and non-conductive. Connected in parallel with transistors 65 is a buffered transistor 71 which aids in the switching of the bistable multivibrator from one state to another state. The standard volume control 40 is connected in circuit in the usual manner and is paralleled by the second resistance element 42. As mentioned previously, the additional resistance element 42 may be either of a variable type or of a fixed type. A diode 73 has the cathode thereof connected to the collector electrodes of transistors 65 and 71 to provide a blocking effect for reverse current into the volume control circuit from the power supply 69. While a diode is here illustrated it will be understood that other suitable circuit blocking means may be utilized.

When the circuit configuration of FIG. 3 is used in the alternate embodiment of FIG. 2, transistors 65 are arranged for conduction when power is initially applied to the circuit and thereby operates as a normally closed switching element.

BRIEF DESCRIPTION OF OPERATION

Assume that transistor 65 is in a non-conductive state and that transistor 66 is in a conductive state during its initial normal condition. When no input signal is provided by closure of the selector switch 52, the collector voltage sensed at transistor 65 is the same as the base emitter voltage sensed across the transistor 66. This therefore, maintains the transistor 66 in a highly conductive state. An input signal obtained by closure of selector switch 52 places a ground potential on the collector of transistors 65. Transistor 71 also conducts through the common load resistor 67. This causes the collector potential on transistor 65 and the base potential on transistor 66 to raise toward a saturation voltage of the transistor. The potential at base electrode of transistors 66, although slightly negative with respect to ground, is sufficient to cutoff transistor 66 thereby causing its collector voltage to increase toward that of the voltage delivered by the battery supply 69. This action causes further conduction of transistor 65 into a saturated state.

The positive feedback between collectors and bases of transistors 66 and 65 result in a rapid change of state of the circuit. Circuit equilibrium is reached when one transistor is conductive and the other transistor is cut off. As mentioned above, the circuit is designed so that transistor 65 is rendered non-conductive when power is initially applied to the circuit. However, it will be understood that suitable set pulse signals may be applied to the circuit to insure this condition if desired.

When power is removed from the circuit by opening of either the manually operated switch 28 or the clock operated power switch 30, the latching circuit 48 reverts to its initial condition thereby rendering transistors 65 non-conductive and providing a standard relatively high volume control condition to exist at the output of the loudspeaker 18. When the circuit of FIG. 3 is used in conjunction with the alternate embodiment of FIG. 2 the operation will be substantially the same except that the transistor 65 will be normally conductive during an initial turn-on condition.

While several embodiments of the details of this invention have been illustrated herein, it will be understood that still other suitable circuit configurations can be utilized to achieve the necessary latching and switching elements necessary to operate a two level volume control in accordance with the principles of this invention.

The invention is claimed as follows:

1. A radio receiver comprising: first means for receiving broadcast radio signals having audio frequency signal information associated therewith, second means coupled to said first means for detecting said audio frequency signal information, third means coupled to said second means for amplifying and reproducing said audio frequency signal information, a volume control circuit including a control knob for manually setting the desired volume level from said amplifying and reproducing means said control knob being coupled to a first resistance element, a power supply coupled to said first, second, and third means for operating the same, on-off switch means for activating said power supply and thereby energizing said first, second, and third means, wherein the improvement comprises; a second resistance element having one end thereof coupled to said volume control circuit, and the other end thereof adapted to be connected to a reference potential, and an electronic latching circuit connected to said power supply to be initially in a first latched state to provide a first volume level from said third means when said on-off switch means is actuated, said latching circuit having a switching element connected to said other end of said second resistance element, said switching element having a first switching state for maintaining said other end of said second resistance element disconnected from said reference potential and having a second state for connecting said other end of said second resistance element to said reference potential, said second resistance element decreasing the volume obtained by said volume control circuit when said switching element is in said first state during one instance, and providing an increase in the volume when said switching element is in said second switching state during another instance.

2. The radio receiver of claim 1, wherein a selector switch is connected in circuit with said latching circuit and provides means for manually energizing said latching circuit to change the state of said switching element and combine the resistance values of said first and second resistance elements when a reduction of volume from said amplifying and reproducing means is desired, said latching circuit being deenergized in response to turning off of said on-off switch means and remaining de-energized during a subsequent turning on of said on-off switch means until such time as said selector switch is actuated.

3. The radio receiver according to claim 2, wherein said selector switch is a momentary contact manually operated switch.

4. The radio receiver according to claim 1, wherein said latching circuit automatically is enabled to be in first open circuit state upon application of the power supply to said first, second, and third means when said on-off switch means is turned on and including a selector switch coupled to said latching circuit for changing the state of said switching element from said first open circuit state to said second closed circuit state.

5. The radio receiver according to claim 4, wherein said switching element is a transistor, and said latching circuit has means coupled to a base electrode of said transistor and responsive to said selector switch for rendering said transistor conductive for connecting said other end of said resistance element to said reference potential.

6. The radio receiver according to claim 5, wherein said transistor forms part of a bistable multivibrator.

7. The radio receiver according to claim 6, wherein said bistable multivibrator is a direct current coupled bistable multivibrator.

8. The radio receiver according to claim 1, wherein said on-off switch means includes electric clock timing means associated therewith for selectively turning on and off the radio receiver at preset times, said latching circuit being set to have its associated switching element in one of its switched conditions each time said on-off switch means is turned on, automatically increase the volume of the audio signal information from said amplifying and reproducing means each time said on-off switch means is turned on.

9. The radio receiver according to claim 8, wherein said latching circuit includes a plurality of transistors connected in circuit as a direct current coupled bistable multivibrator, and wherein one of said plurality of transistors forms said switching element.

10. The radio receiver according to claim 9, further including a diode connected in circuit with said one of said plurality of transistors to prevent operating current from said bistable multivibrator from affecting said volume control circuit.

* * * * *